United States Patent [19]

Tomosada et al.

[11] 4,402,598

[45] Sep. 6, 1983

[54] EXPOSURE CONTROL APPARATUS

[75] Inventors: Masahiro Tomosada, Kawasaki; Haruhisa Honda, Tokyo; Kanou Tanaka, Yokohama, all of Japan

[73] Assignee: Canon Kabushiki Kaisha, Tokyo, Japan

[21] Appl. No.: 406,989

[22] Filed: Aug. 10, 1982

Related U.S. Application Data

[63] Continuation of Ser. No. 219,519, Dec. 23, 1980, abandoned.

[30] Foreign Application Priority Data

Dec. 27, 1979 [JP] Japan .............................. 54/172409

[51] Int. Cl.$^3$ .............................................. G03B 27/72

[52] U.S. Cl. ...................................................... 355/69

[58] Field of Search ...................... 355/38, 41, 64, 68, 355/69

[56] References Cited

U.S. PATENT DOCUMENTS

| | | | |
|---|---|---|---|
| 3,738,242 | 6/1973 | Lee et al. | 355/68 X |
| 4,018,526 | 4/1977 | Schroter | 355/68 |
| 4,046,475 | 9/1977 | Booth et al. | 355/69 |
| 4,124,294 | 11/1978 | Nakamura | 355/68 |

*Primary Examiner*—Michael L. Gellner

*Attorney, Agent, or Firm*—Fitzpatrick, Cella, Harper & Scinto

[57] ABSTRACT

Exposure control apparatus for use in a duplicating machine includes a light source powered with a high-frequency pulsed voltage to generate light, a sensor for sensing intensity of the light to produce a sensor output, and control circuitry for controlling the on/off timing of the pulsed voltage in response to the sensor output. At the time of initial turn-on of the lamp the power applied to such lamp is supplied at an increased rate to hasten the turn-on time.

10 Claims, 6 Drawing Figures

EXPOSURE CONTROL APPARATUS

This is a continuation of application Ser. No. 219,519, filed Dec. 23, 1980, now abandoned.

BACKGROUND OF THE INVENTION

1. Field of the Invention

The present invention relates to exposure control apparatus for use in a copier or the like, and more particularly to exposure control apparatus in which the intensity of the light from an exposure lamp is sensed to produce a detection signal and the current supply to the exposure lamp is regulated according to the detection signal thereby maintaining the light intensity at a determined level.

2. Description of the Prior Art

The lamp for illuminating an original document, used in the copier or the like, should preferably have a constant light intensity, as otherwise it becomes not possible to obtain a copy with a desired density, or to maintain a constant density in a series of copies from the same original document. In order to obtain a constant intensity there is known a control method of maintaining a constant supply voltage to the lamp. However the lamp luminance is influenced by external conditions such as temperature and cannot be maintained constant simply by the constant supply voltage. It can therefore be considered to detect the luminance of a fluorescent lamp and to accordingly control the voltage supplied to the fluorescent lamp thereby maintaining a constant luminance thereof. However, even when a desired luminance is obtained after the start of power supply, it is not easy to achieve a constant luminance because of the associated factors such as the circuit response or afterglow of the lamp.

SUMMARY OF THE INVENTION

An object of the present invention is to provide exposure control apparatus not associated with the above-mentioned drawbacks and capable of continuously providing a stable desired luminance without unevenness in time.

Another object of the present invention is to provide exposure control apparatus permitting rapid start of the lamp regardless of the circumferential temperature.

Still another object of the present invention is to provide exposure control apparatus capable of stably maintaining an arbitrarily predetermined luminance regardless of the time and temperature.

BRIEF DESCRIPTION OF THE DRAWINGS

Still other objects and advantages of the present invention will become apparent from the following description to be taken in conjunction with the attached drawings, in which.

DESCRIPTION OF THE PREFERRED EMBODIMENTS

The foregoing objects of the present invention are achieved by exposure control apparatus adapted for use in the copier, duplicator and the like, which is featured in detecting the luminance or light intensity of an illuminating lamp driven by a pulsated voltage and controlling the switching time of the pulse switching to maintain a constant intensity.

Figure 1:
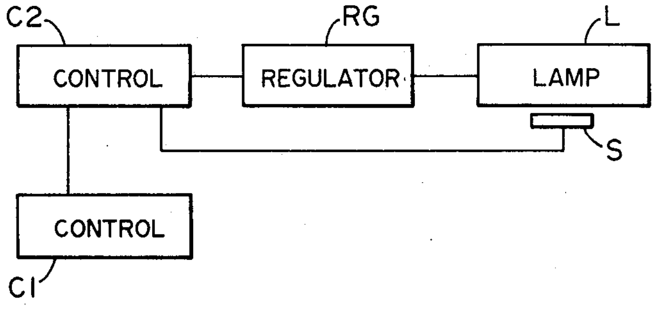
FIG. 1 is a schematic block diagram of the control circuit of the exposure control apparatus embodying the present invention.

FIG. 1 shows the circuit structure of the exposure control apparatus of the present invention in a block diagram, in which there are shown a lamp L such as a fluorescent lamp, a detector S composed for example of a photodiode positioned close lamp L for sensing the light intensity thereof, a regulator RG for supplying a voltage to lamp L, a first control C1 provided with a manual regulator such as a variable resistor for presetting the lamp intensity and adapted for generating a reference signal corresponding to the preset light intensity, and a second control C2 for controlling regulator RG in response to the reference signal supplied from the control C1 and the detection signal supplied from the detector S1.

The control C2 compares the detection signal from detector S with the reference signal supplied from the control C1, and, in case the light intensity is identified as significantly lower than the preset intensity, regulates the voltage supplied from the regulator RG to the lamp L so as to reach a voltage substantially equal to or higher than the nominal value, for example by supplying an unswitched continuous voltage. Also in case the light intensity of the lamp L is identified as close to the present value, the control circuit reduces the effective voltage from the value at the lamp start for example by supplying a pulsated voltage thereby maintaining the predetermined intensity. Also in case the light intensity of the lamp L is identified as higher than the present value, the control circuit further reduces the effective voltage supplied to the lamp L to lower the light intensity to the predetermined value for example by decreasing the period of voltage application to zero or almost zero.

Figure 2:
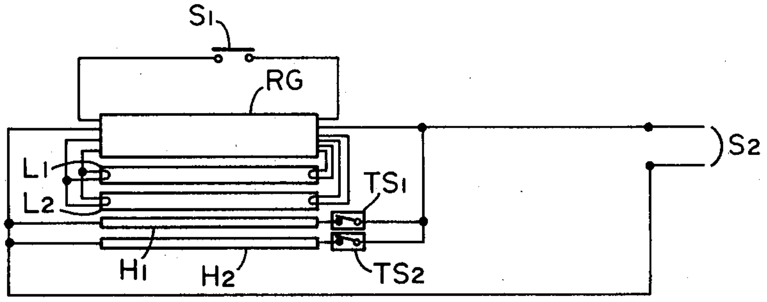
FIG. 2 is a schematic circuit diagram of the lamp power unit shown in FIG. 1.

FIG. 2 shows an example of the regulator RG and lamp L in FIG. 1, in which there are shown a power source S2 of the commercial frequency, fluorescent lamps L1, L2, heaters H1, H2 for preheating the lamps L1, L2 for achieving rapid start, thermostats TS1, TS2 for on and off control of the heaters, and a switch S1 for starting energizing the lamp.

Figure 3:
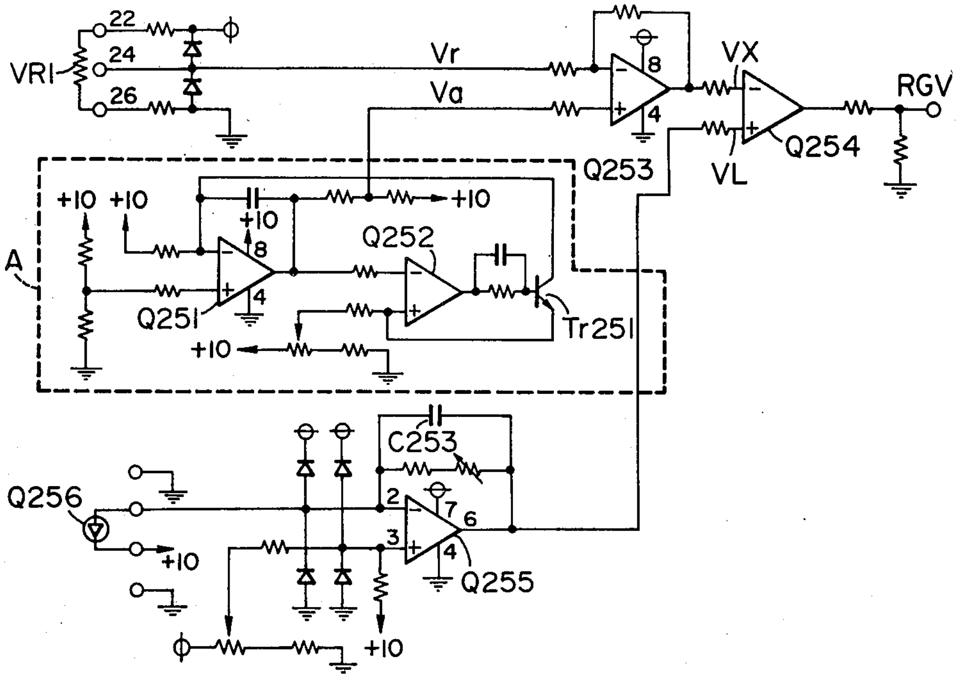
FIG. 3 is a schematic circuit diagram showing an embodiment of the exposure control apparatus in accordance with the present invention.
Figure 4:
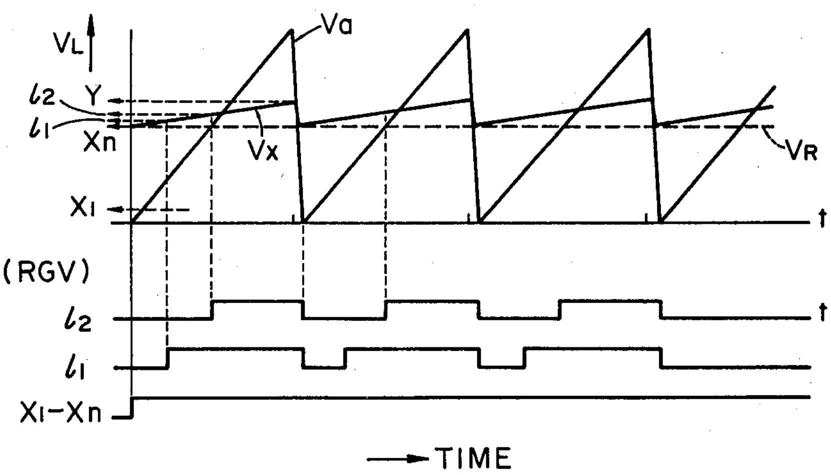
FIG. 4 shows waveforms of the exposure control apparatus shown in FIG. 3.

FIG. 3 shows an example of the exposure control circuitry of the present invention corresponding to the controls C1, C2 in FIG. 1, in which there are provided a manual regulator VR1 composed of a variable resistor for intensity presetting and adapted to produce a preset voltage Vr, a photodiode Q256 provided in the detector S, an oscillator circuit A for generating a sawtooth drive voltage as shown by Va in FIG. 4, an amplifier Q253 for producing a reference voltage Vx by the addition of the preset voltage Vr and the drive voltage Va, an amplifier Q255 for generating a detection voltage VL by the current-voltage conversion of the change in the detection signal from the photodiode Q256, a capacitor C253 for smoothing short ripples in the light intensity, and a differential amplifier Q254 for supplying a control voltage RGV through the comparison of the reference voltage Vx with the detection voltage VL.

Upon closing the switch S1 (FIG. 2) at the lamp start, the DC voltage source shown in FIG. 3 is activated to initiate the operation of the circuit. As the lamp L is off in this state, the photodiode Q256 is in its off state whereby the amplifier Q255 provides a maximum output close to +10 volts and determined by the reference voltage Vx of the differential amplifier Q254. Reference voltage Vx is determined in relation to the preset voltage Vr and the drive voltage Va as shown in FIG. 4 and varies therefore according to the preset voltage Vr, thus allowing the light intensity to be regulated in response to the manual regulator VR1.

Again referring to FIG. 4, the differential amplifier Q254, after the lamp start, supplies a non-switched continuous voltage RGV to the regulator, as shown by Xl-Xn in FIG. 4, regardless of the change in the voltage Va, thus accelerating the lamp start. The supply of such continuous voltage is continued until the detection voltage VL reaches Xn. When the detection voltage VL exceeds the reference voltage Vx after Xn, the differential amplifier Q254 produces a zero output. In this manner the control voltage RGV supplied by amplifier Q254 becomes a voltage determined by the reference voltage Vx and the detection voltage VL when the detection voltage VL is smaller than the reference voltage Vx, and becomes zero when the detection voltage VL exceeds the reference voltage Vx. In FIG. 4 there are shown the control voltages RGV corresponding to detection voltages 1, 2 as reference. In a region close to the preset light intensity, the control voltage RGV is pulse switched and controlled in intervals.

In the case of supplying a repeatedly switched voltage to the fluorescent lamp, a control method with a fixed reference voltage Vx and with unfixed switching frequency may result in an unstable hunting in the light intensity due to the start and after glow characteristic of such a fluorescent lamp.

In order to overcome such a drawback, the apparatus of the present invention employs a fixed switching frequency in combination with a variable reference voltage Vx within a certain range as shown in FIG. 4, and determines the switching time of the supply voltage in the circuit, thus allowing to stabilize the signal height |Xn~Y| of the reference voltage Vx. Also the lamp start is accelerated by the value Xn of the reference voltage Vx which is determined by the preset voltage Vr of the manual regulator VR1.

The light intensity of the fluorescent lamp becomes stabilized on a certain point on the waveform of the reference voltage Vx.

As shown in FIG. 4, the fluorescent lamp receives an unswitched continuous voltage during the high level state of the control voltage RGV if the light intensity is lower than Xn, and the voltage supplied to the lamp is controlled by a time duration when the intensity reaches a certain point along the waveform of the reference voltage Vx to achieve a stable light intensity. Also in case the intensity exceeds Y, the voltage supply is entirely interrupted by time control so as to reduce the intensity to the present value. The wave height of the reference Vx should preferably be small as an excessively large wave height provides an excessively wide stabilization, thus preventing an exact intensity regulation to be realized. On the other hand an excessively small wave height will lead to a hunting phenomenon in the light intensity. For this reason a ratio as shown in FIG. 4 is desirable, but a desirable value can be experimentally determined in practice.

In case the preset voltage Vr is varied by the variable resistor VR1, the reference voltage Vx shown in FIG. 4 is vertically displaced, whereby a wave height control is performed between thus displaced value and the aforementioned value Xn~Y to supply a pulsated voltage to the fluorescent lamp thereby maintaining a determined light intensity.

Also in case the lamp starts more slowly due to a lower circumferential temperature, the start can be accelerated as the lamp continues to receive the unswitched continuous voltage until the light intensity reaches the preset value.

As discussed in the foregoing the exposure control apparatus according to the present invention is much more suitable for use as the exposure light source in a copier as it enables a stable light intensity to be maintained because of the presence of a stable region in the voltage supply characteristic.

Figure 5:
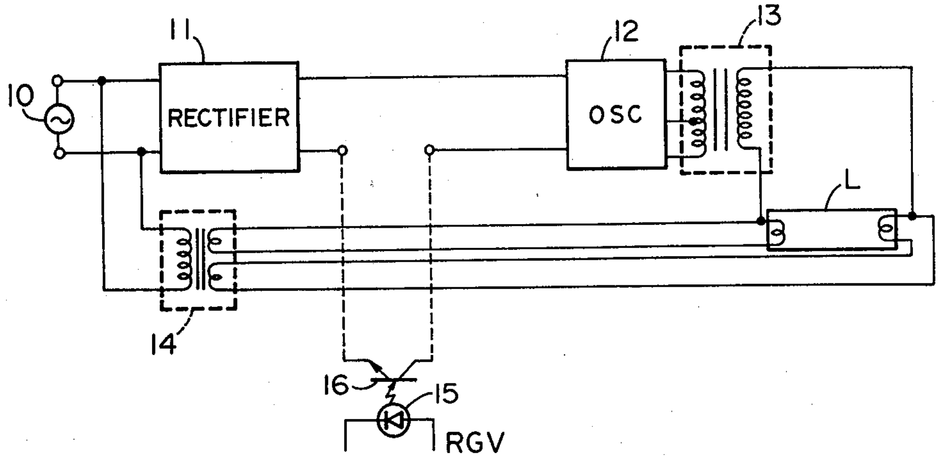
FIG. 5 is a schematic block diagram showing an embodiment of the regulator shown in FIG. 1.
Figure 6:
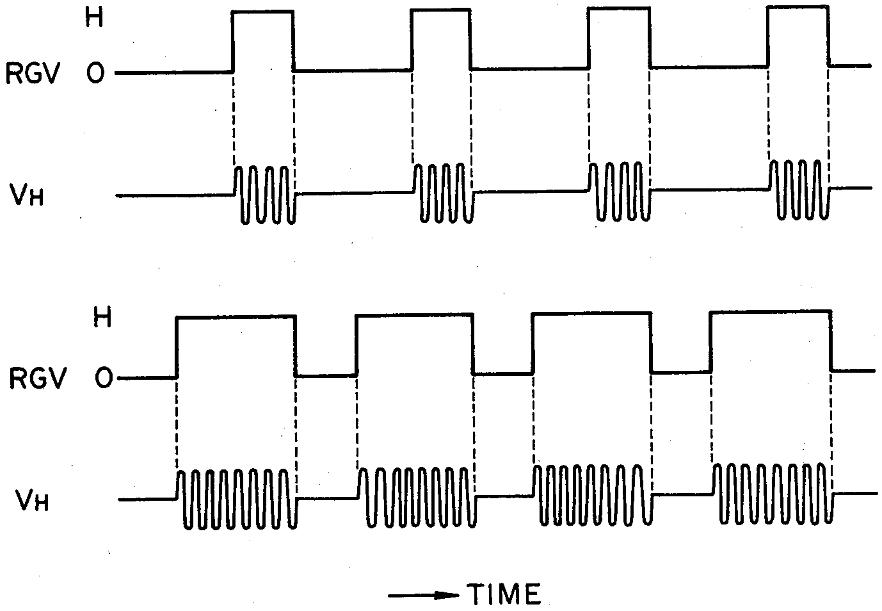
FIG. 6 is the waveforms showing the relation between the control voltage shown in FIG. 3 and the voltage supplied to the lamp.

FIG. 5 shows an example of the regulator RG shown in FIG. 1, in which shown are an AC source 10, a rectifier circuit 11, an oscillator 12, transformers 13, 14, a light-emitting diode 15, a photodetector 16 and a fluorescent lamp L. The control voltage RGV supplied to the regulator RG energizes the light-emitting diode 15, in response to the light of which the photodetector 16 is rendered conductive to initiate the high-frequency oscillation of the oscillator 12 for lighting the fluorescent lamp L. FIG. 6 shows the relationship between the high-frequency voltage $V_H$ supplied to the lamp L and the control voltage RGV. The high-frequency voltage $V_H$ is supplied or not to the fluorescent lamp L respectively at the high level H and the zero level of the control voltage RGV. Despite of the pulsated high-frequency voltage supply, the fluorescent lamp L remains continuously lighted due to the afterglow characteristic thereof. In this manner the fluorescent lamp L is energized by the high-frequency voltage pulse-switched in response to the switch timing of the control voltage RGV, and the light intensity of the lamp is controlled by the change in the switch timing.

Although in the foregoing embodiment the lamp L is powered by an unswitched voltage for accelerating the lamp start, it is also possible to employ the pulsated voltage also at the lamp start in case a rapid start is not required. Also the present invention, which has been explained with reference to the fluorescent lamp, is applicable to the start and stabilization of other lamps such as a halogen lamp.

What we claim is:

1. Exposure control apparatus comprising:

a light source;

generating means for generating a high-frequency voltage to drive said light source;

means for applying pulses of said high-frequency voltage to said light source;

sensing means for sensing the light intensity of said light source; and control means for controlling a ratio of on/off time of said pushed high-frequency voltage in response to an output signal of said sending means.

2. Exposure control apparatus according to claim 1, wherein said control means varies said time ratio in response to a comparison of the output signal of said sensing meqns with a preset reference signal.

3. Exposure control apparatus according to claim 2, wherein said exposure control apparatus comprises at least one light switching member to control said high-frequency voltagve application.

4. Exposure control apparatus according to claim 2, wherein said control means performs such control that power is repeatedly supplied to said light source at intervals and at a level causing said light to approximate said predetermined intensity.

5. Exposure control apparatus comprising:

a light source;

means for applying a pulsed voltage for energizing said light source;

sensing means for sensing the light intensity of said light source; and signal generating means for generating a periodic signal;

intensity setting means for setting the light intensity of said light source by producing a setting signal corresponding to the light intensity;

first control means for generating a reference signal by executing an arithmetic operation process on both said periodic signal and the setting signal from said intensity setting means; and second control means for controlling the time duration of the pulses of voltage applied to said light sources in response to a signal resulting from a comprison of the reference signal with an output signal of said sensing means.

6. Exposure control apparatus according to claim 5, wherein said first control means controls an output level of the reference signal by adding the setting signal of said intensity setting means to said periodic signal.

7. Exposure control apparatus according to claim 5, wherein said signal generating means is adapted to generate a sawtooth signal.

8. Exposure control apparatus according to claim 5, wherein the reference signal is a constant periodic signal with a constant wave height.

9. Exposure control apparatus comprising:

a light source;

means for applying a pulsed voltage for energizing said light source;

sensing means for sensing the light intensity of said light source; and control means for controlling the time duration of the voltage pulses applied to said light source in response to the output of said sensing means to maintain a predetermined light intensity value of said light source;

wherein said control means, at the initiation of the lighting, applies to said light source a predetermined initial power in response to said sensing means until the light intensity of said light sources reaches a predetermined value.

10. Exposure control apparatus according to claim 9, wherein said control means comprises:

means for generating a reference signal corresponding to the predetermined light intensity value of said light source; and means for comparing said reference signal with an output signal of said sending means, wherein said control means performs said control operation in response to an output from said comparing means.

* * * * *

UNITED STATES PATENT AND TRADEMARK OFFICE

CERTIFICATE OF CORRECTION

PATENT NO. : 4,402,598

DATED : September 6, 1983

INVENTOR(S) : MASAHIRO TOMOSADA, ET AL.

It is certified that error appears in the above-identified patent and that said Letters Patent is hereby corrected as shown below:

COLUMN 2

Line 27, "S1" should read --S--.

Line 41, "present" should read --preset--.

COLUMN 3

Line 31, "1,2" should read --$\ell$1, $\ell$2--.

Line 62, "present" should read --preset--.

CLAIM 1

Line 10, "pushed" should read --pulsed--.

CLAIM 2

Line 4, "meqns" should read --means--.

CLAIM 3

Line 4, "voltagve" should read --voltage--.

UNITED STATES PATENT AND TRADEMARK OFFICE

CERTIFICATE OF CORRECTION

PATENT NO. : 4,402,598 Page 2 of 2

DATED : September 6, 1983

INVENTOR(S) : MASAHIRO TOMOSADA, ET AL.

It is certified that error appears in the above-identified patent and that said Letters Patent is hereby corrected as shown below:

CLAIM 5

Line 19, "comprison" should read --comparison--.

CLAIM 9

Line 15, "sources" should read --source--.

CLAIM 10

Line 7, "sending" should read --sensing--.

Signed and Sealed this

*Tenth* Day of *April 1984*

[SEAL]

*Attest:*

GERALD J. MOSSINGHOFF

*Attesting Officer* *Commissioner of Patents and Trademarks*